US012188417B1

(12) United States Patent
Stachowiak et al.

(10) Patent No.: US 12,188,417 B1
(45) Date of Patent: Jan. 7, 2025

(54) ROTATING CARRIER OIL MANIFOLD

(71) Applicant: RTX CORPORATION, Farmington, CT (US)

(72) Inventors: David Allen Stachowiak, Durham, CT (US); Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/370,505

(22) Filed: Sep. 20, 2023

(51) Int. Cl.
 *F02C 7/36* (2006.01)
 *F02C 7/06* (2006.01)

(52) U.S. Cl.
 CPC ............ *F02C 7/36* (2013.01); *F02C 7/06* (2013.01); *F05D 2220/36* (2013.01); *F05D 2240/53* (2013.01); *F05D 2260/40311* (2013.01); *F05D 2260/98* (2013.01)

(58) Field of Classification Search
 CPC .......... F02C 7/36; F02C 7/06; F05D 2220/36; F05D 2240/53; F05D 2260/40311; F05D 2260/98
 See application file for complete search history.

(56) References Cited

U.S. PATENT DOCUMENTS

| | | | |
|---|---|---|---|
| 8,484,942 B1 * | 7/2013 | McCune | F01D 25/18 384/473 |
| 8,777,793 B2 * | 7/2014 | Sheridan | F01D 25/16 475/331 |
| 9,068,629 B2 * | 6/2015 | Sheridan | F02C 7/36 |
| 9,404,420 B2 * | 8/2016 | Gallet | F16H 57/0456 |
| 9,695,710 B2 * | 7/2017 | McCune | F16H 57/0479 |
| 9,896,969 B2 * | 2/2018 | Sheridan | F01D 25/183 |
| 9,995,174 B2 * | 6/2018 | McCune | F01N 11/00 |
| 10,161,409 B2 | 12/2018 | Sheridan et al. | |

FOREIGN PATENT DOCUMENTS

WO    2018177646 A1    10/2018

* cited by examiner

*Primary Examiner* — Lorne E Meade
(74) *Attorney, Agent, or Firm* — Carlson, Gaskey & Olds, P.C.

(57) ABSTRACT

A fan drive gear system for a turbine engine includes a carrier that supports rotation of the plurality of intermediate gears and is configured for rotation about the axis. A rotating oil inlet and rotating gutter are attached to the carrier. A transfer bearing is fixed to a static engine structure and engaged to communicate oil to the rotating oil inlet. A static baffle that is disposed radially outward of the transfer bearing and configured to direct oil that is expelled from the transfer bearing into the rotating gutter.

20 Claims, 3 Drawing Sheets

ROTATING CARRIER OIL MANIFOLD

TECHNICAL FIELD

The present disclosure relates generally to an aircraft propulsion system that includes a fan drive gear system with a rotating carrier.

BACKGROUND

A turbine engine typically includes a fan section, a compressor section, a combustor section, and a turbine section. A speed reduction device such as an epicyclical gear assembly may be utilized to drive the fan section such that the fan section may rotate at a speed different than the turbine section so as to increase the overall propulsive efficiency of the engine. A carrier may support a plurality of planetary gears and rotate about an engine axis. Rotation of the carrier can present challenges for recovering lubricant expelled from the gear system during operation. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a sun gear that is configured to be driven by an engine shaft that is rotatable about an axis, a plurality of intermediate gears that are intermeshed with the sun gear, a ring gear assembly that engages with the plurality of intermediate gears, the ring gear is configured for attachment to a static structure, a carrier that supports rotation of the plurality of intermediate gears, the carrier is configured for rotation about the axis and includes a rotating oil inlet, a rotating gutter that is attached to the carrier, a transfer bearing that is fixed to a static engine structure and engaged to communicate oil to the rotating oil inlet, a static baffle that is disposed radially outward of the transfer bearing and configured to oil that is expelled from the transfer bearing into the rotating gutter, an aft auxiliary reservoir that is disposed radially outward of the rotating gutter, an oil receiving surface that is configured to receive expelled oil from the rotating gutter and communicate the oil into the aft auxiliary reservoir, and a fan shaft that is coupled to the carrier.

In a further embodiment of the foregoing fan drive gear system, the rotating oil inlet extends axially aft from the carrier.

In a further embodiment of any of the foregoing fan drive gear systems, the rotating gutter is configured to impart momentum into lubricant that is communicated from the static baffle.

In a further embodiment of any of the foregoing fan drive gear systems, the rotating gutter extends radially outward of an outlet of the static baffle.

In a further embodiment of any of the foregoing fan drive gear systems, the oil receiving surface includes at least one scoop for capturing expelled lubricant from the gear system and from the rotating gutter.

In a further embodiment of any of the foregoing fan drive gear systems, the oil receiving surface is part of the aft auxiliary reservoir.

In a further embodiment of any of the foregoing, the fan drive gear system further includes a forward auxiliary reservoir with a forward oil receiving surface that is configured to receive oil that is expelled forward of the gear system.

In a further embodiment of any of the foregoing fan drive gear systems, the ring gear includes at least one passage for communicating expelled lubricant into at least one of the forward auxiliary reservoir and the aft auxiliary reservoir.

In a further embodiment of any of the foregoing fan drive gear systems, the static baffle is annular about the engine axis and the transfer bearing.

In a further embodiment of any of the foregoing fan drive gear systems, the rotating gutter is attached to radially outward of journal bearings that supports rotation of a corresponding one of the plurality of intermediate gears.

A turbine engine assembly according to another exemplary embodiment of this disclosure includes, among other possible things, a static engine structure, a fan section that includes a fan shaft that is coupled to a hub that supports a plurality of blades that are rotatable about an axis, a fan drive gear system that includes a sun gear that is configured to be driven by an engine shaft that is rotatable about an axis, a plurality of intermediate gears are intermeshed with the sun gear, a ring gear assembly is engaged with the plurality of intermediate gears, the ring gear is configured for attachment to a static structure, a carrier that supports rotation of the plurality of intermediate gears, the carrier is configured for rotation about the axis and includes a rotating oil inlet, and a rotating gutter that is attached to the carrier. A transfer bearing is fixed to a static engine structure and engaged to communicate oil to the rotating oil inlet. A static baffle is disposed radially outward of the transfer bearing and configured to capture oil that is expelled from the transfer bearing into the rotating gutter. An aft auxiliary reservoir is disposed radially outward of the rotating gutter. An oil receiving surface is configured to receive expelled oil from the rotating gutter and communicate the oil into the aft auxiliary reservoir. A fan shaft is coupled to the carrier. A primary lubricant system communicates lubricant to the fan drive gear system, and an auxiliary lubricant system includes an auxiliary reservoir that is configured to receive lubricant that is expelled from the fan drive gear system and communicated through the fixed gutter.

In a further embodiment of the foregoing turbine engine assembly, the rotating oil inlet extends axially aft from the carrier.

In a further embodiment of any of the foregoing turbine engine assemblies, the rotating gutter is configured to impart momentum into lubricant that is communicated from the static baffle.

In a further embodiment of any of the foregoing turbine engine assemblies, the rotating gutter extends radially outward of an outlet of the static baffle.

In a further embodiment of any of the foregoing turbine engine assemblies, the oil receiving surface includes at least one scoop for capturing expelled lubricant from the gear system and from the rotating gutter.

In a further embodiment of any of the foregoing, the turbine engine assembly further includes a forward auxiliary reservoir with a forward oil receiving surface that is configured to receive oil that is expelled forward of the gear system.

In a further embodiment of any of the foregoing turbine engine assemblies, the ring gear includes at least one passage for communicating expelled lubricant into at least one of the forward auxiliary reservoir and the aft auxiliary reservoir.

A lubrication system for a gas turbine engine according to another exemplary embodiment of this disclosure includes, among other possible things, a transfer bearing that is fixed to a static engine structure and engaged to communicate oil to a rotating oil inlet of a rotating carrier of a fan drive gear system, a static baffle that is disposed radially outward of the transfer bearing and configured to capture oil that is expelled from the transfer bearing into a rotating gutter that is attached to the rotating carrier, an aft auxiliary reservoir that is disposed radially outward of the rotating gutter, an oil receiving surface that is configured to receive expelled oil from the rotating gutter and communicate the oil into the auxiliary reservoir, a primary lubricant system that communicates lubricant to the fan drive gear system, and an auxiliary lubricant system that includes the aft auxiliary reservoir that is configured to communicate recovered oil to at least one of the fan drive gear system and the primary lubrication system.

In a further embodiment of the foregoing lubrication system, the oil receiving surface includes at least one scoop for capturing expelled lubricant from the gear system and from the rotating gutter.

In a further embodiment of any of the foregoing, the lubrication system further includes a forward auxiliary reservoir with a forward oil receiving surface that is configured to receive oil that is expelled forward of the gear system.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
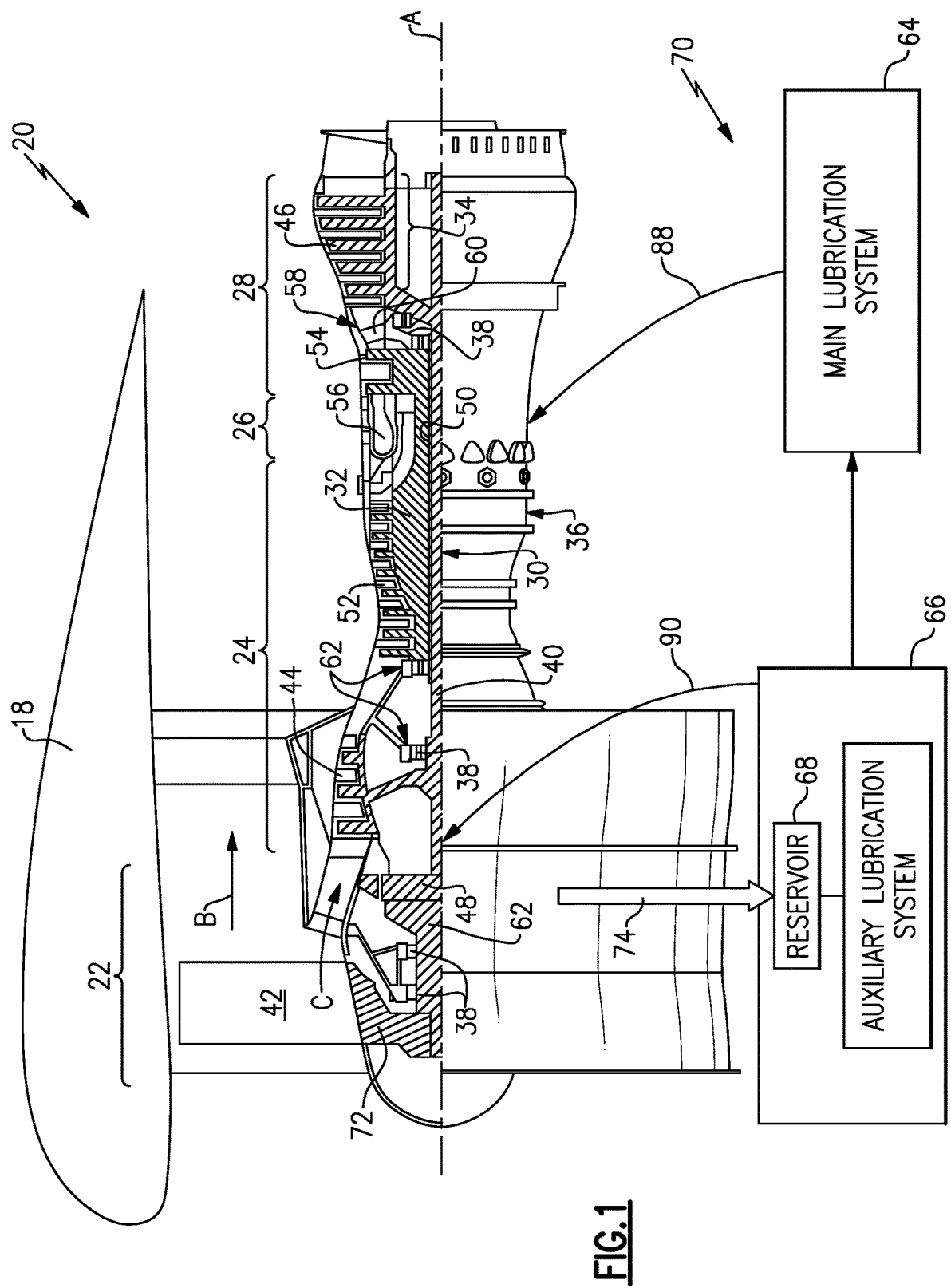
FIG. 1 is a schematic view of an example gas turbine engine including a planetary fan drive gear system.

FIG. 1 schematically illustrates a gas turbine engine 20 with an epicyclic fan drive gear system 48 having a rotating carrier that is fed lubricant by a transfer bearing. Oil leakage from the carrier and the transfer bearing is directed into a rotating gutter that imparts momentum to drive the oil into an auxiliary reservoir.

The gas turbine engine 20 is disclosed by way of example as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72. Moreover, although the example turbine engine 20 is shown with the fan section 22 disposed within the nacelle 18, a turboprop engine is also within contemplation and scope of this disclosure.

The fan drive gear system 48 is an epicycle gear train with a gear reduction ratio of greater than about 5:1 and less than about 18:1. In another example embodiment, the fan drive gear system 48 provides a gear reduction ratio of between 8:1 and 13.5:1. The gear system 48 is coupled to the fan shaft 62 that is coupled to a hub 72 supporting a plurality of fan blades 42. The gear system 48 drives the fan blades 42 about the engine axis A. It should be understood, however, that the above parameters are only exemplary of one embodiment of a geared engine architecture and that the present disclosure is applicable to other gas turbine engine architectures including turbofan, turboshaft, and open rotor engines.

The example engine 20 includes a lubrication system 70 with a main lubrication system 64 and an auxiliary lubrication system 66. The auxiliary lubrication system 66 includes a reservoir 68 that receives lubricant expelled 74 from the fan drive gear system 48. Lubricant from the auxiliary lubrication system 66 may be fed back to the main lubrication system and/or fed back to the gear system 48.

Figure 2:
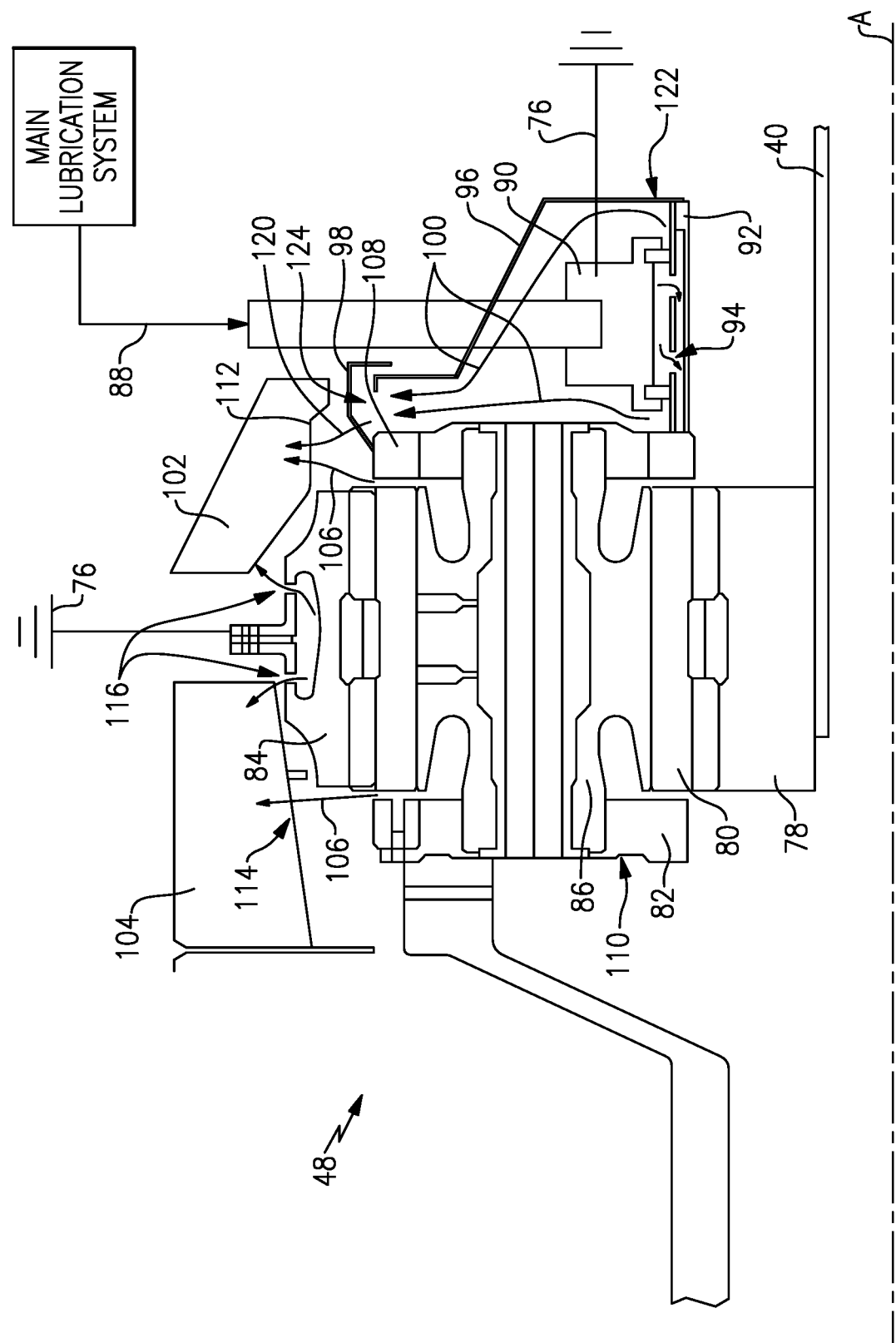
FIG. 2 is a schematic view of an example fan drive gear system.

Referring to FIG. 2 with continued reference to FIG. 1, the example fan drive gear system 48 is an epicyclic gear system with a sun gear 78 coupled to a portion of the low shaft 40 and engaged to a plurality of intermediate gears 80 supported on a corresponding journal bearing 86 within a rotating carrier 82. A ring gear 84 circumscribes the intermediate gears 80 and is fixed to a static engine structure 76.

The fan shaft 62 is coupled to the carrier 82 and extends radially inward and forward of the gear system 48 to the fan hub 72 (FIG. 2). Lubricant 88 is supplied to the gear system 48 from the main lubrication system 64 through a transfer bearing 90. The carrier 82 includes a rotating inlet 92 that extends axially aft. The transfer bearing 90 is fixed to an engine static structure 76 and engages the rotating inlet 92 to communicate oil through passages 94. Oil communicated through the rotating inlet 92 is provided to each gear interface and to the bearing surfaces between the journal bearings 86 and the intermediate gears 80.

Some oil indicated by arrows 100 leaks through the interface 122 between the rotating inlet 92 and the transfer bearing 90. A static gutter 96 is disposed around the transfer bearing 90 to collect and direct the leakage oil 100. The example static gutter 96 is disposed radially outward of the rotating inlet 92 and the transfer bearing 90. In this example, the rotating inlet 92 and the transfer bearing 90 are disposed aft of the gear system 48.

A rotating gutter 98 is attached to an aft portion 108 of the carrier 82 and captures oil exhausted through a radial opening 124 of the static gutter 96. The rotating gutter 98 rotates with the carrier 82 and imparts rotational momentum into oil exhausted from the static gutter 96. Oil within the rotating gutter 98 is energized and driven radially outward toward an aft auxiliary reservoir 102. An oil receiving surface 112 receives the energized oil indicated by arrows 120 and communicates it into the auxiliary reservoir 102.

A forward auxiliary reservoir 104 is disposed radially outward and at least partially forward of the gear system 48. The forward auxiliary reservoir 104 includes a forward oil receiving surface 114. Oil 106 expelled from a forward portion 110 of the carrier 82 and portions of the gear system 48 is captured on the oil receiving surface 114 and communicated into the reservoir 104. Oil captured within either of the aft reservoir 102 and the forward reservoir 104 may be communicated back into the main lubrication system 64 or back into the gear system 48.

The ring gear 84 includes passages 116 for communicating oil into at least one of the forward auxiliary reservoir 104 and the aft auxiliary reservoir 102.

Figure 3:
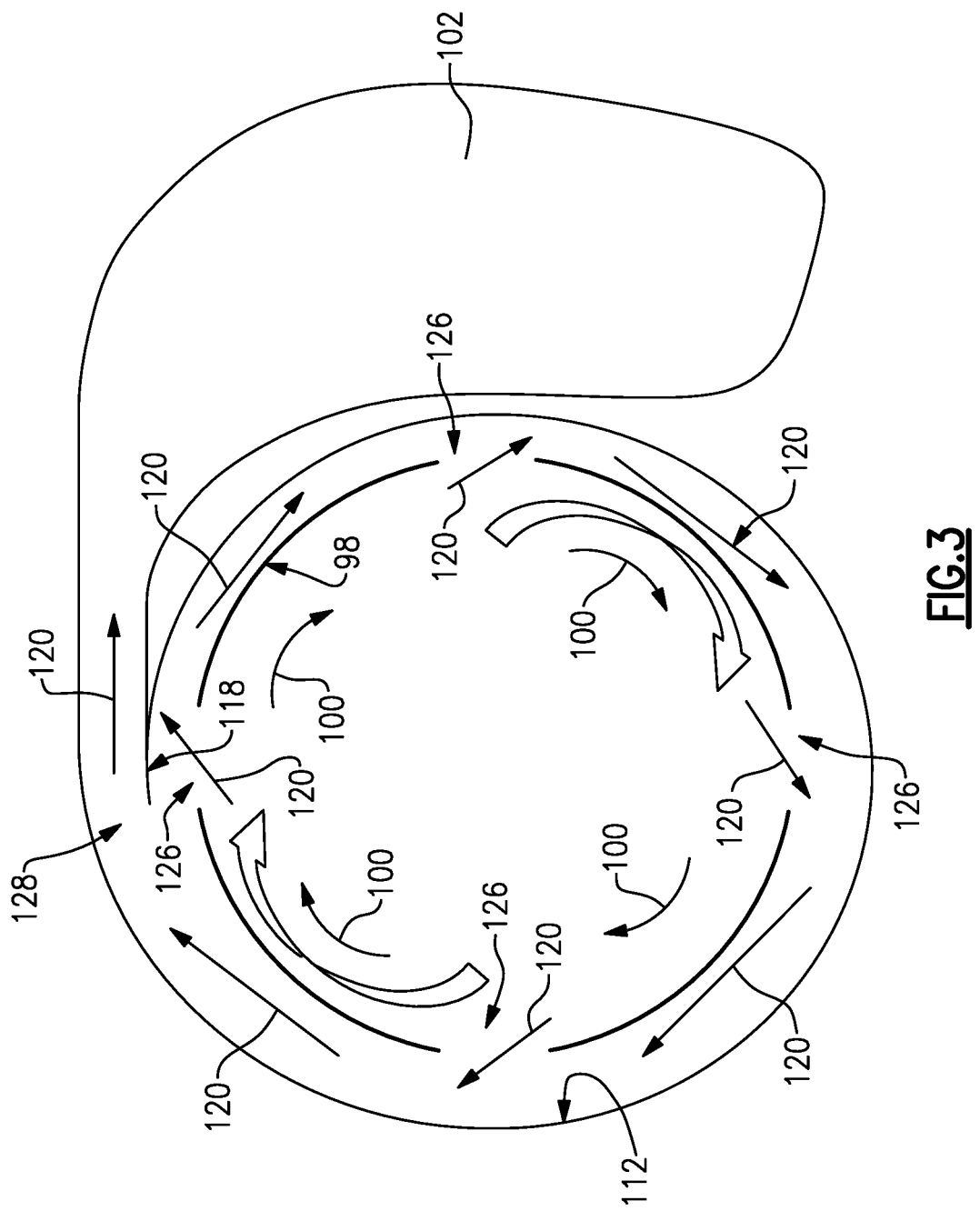
FIG. 3 is a schematic view of a lubricant recovery system of the example fan drive gear system.

Referring to FIG. 3, with continued reference to FIGS. 1 and 2, leakage oil 100 is captured within the rotating gutter 98. Rotation of the gutter 98 energizes the oil to generate an accelerated oil flow 120. The accelerated oil flow 120 is directed outward through openings 126 in the rotating gutter 98 toward the oil receiving surface 112. The accelerated oil flow 120 has a rotational momentum that drives the oil radially outward onto the oil receiving surface 112. The oil receiving surface 112 includes at least one opening 128 to communicate oil into the auxiliary reservoir 102. The example auxiliary reservoir 102 is shown as a generally annular shape disposed about the rotating gutter 98. However, the auxiliary reservoir 102 may be of other shapes and sizes tailored to application specific space requirements.

An oil guiding feature is provided on the static oil receiving surface 112 near each opening 128. In one disclosed embodiment, the oil guide feature is a scoop 118 that guides the rotating oil flow through the opening 128. The scoop 118 are shaped and sized to guide rotating oil flow into the auxiliary reservoir 102. The rotational momentum imparted by the rotating gutter attached to the carrier 82 provides for the oil to flow radially outward and into the auxiliary reservoir 102. Similarly, the rotational momentum imparted by rotation of the carrier 82 on the oil 106 expelled from the gear system provides for the oil to flow into the forward auxiliary reservoir 104.

In one example operational embodiment, oil 88 is communicated to the gear system 48 through the static transfer bearing 90 and into the rotating inlet 92. Oil is expelled from the gear system and leaks from the interface 122 at the transfer bearing 90. A static baffle surrounds the transfer bearing and directs leaked oil 100 radially outward and through the radial opening 124. Oil exhausted through the radial opening is captured in the rotating gutter 98. The rotating gutter 98 is attached to the aft portion 108 of the carrier 82. Rotation of the gutter 98 imparts rotational and radially outward directed momentum on the oil. The radially outward momentum propels the oil through openings 126 (FIG. 3) and against the oil receiving surface 112. The rotational momentum of the oil drives the accelerated oil flow 120 circumferentially along the oil receiving surface 112. Scoop 118 of the oil receiving surface 112 direct oil through opening 128 into the auxiliary reservoir 102. Oil accumulated in the auxiliary reservoir 102 may be communicated to the main lubrication system 64 for recirculation and/or routed directly back to the gear system 48 depending on current operational needs.

Accordingly, the example rotating gutter collects both expelled oil and oil leakage from the transfer bearing and imparts momentum on the captured oil to drive in into an auxiliary reservoir.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
   a sun gear configured to be driven by an engine shaft rotatable about an axis;
   a plurality of intermediate gears intermeshed with the sun gear;
   a ring gear assembly engaged with the plurality of intermediate gears, the ring gear configured for attachment to a static structure;
   a carrier supporting rotation of the plurality of intermediate gears, the carrier is configured for rotation about the axis and includes a rotating oil inlet;
   a rotating gutter attached to the carrier;
   a transfer bearing fixed to a static engine structure and engaged to communicate oil to the rotating oil inlet;
   a static baffle disposed radially outward of the transfer bearing and configured to communicate oil expelled from the transfer bearing into the rotating gutter;
   an aft auxiliary reservoir disposed radially outward of the rotating gutter;
   an oil receiving surface that is configured to receive expelled oil from the rotating gutter and communicate the oil into the aft auxiliary reservoir; and
   a fan shaft coupled to the carrier.

2. The fan drive gear system as recited in claim 1, wherein the rotating oil inlet extends axially aft from the carrier.

3. The fan drive gear system as recited in claim 2, wherein the rotating gutter is configured to impart momentum into the oil communicated from the static baffle.

4. The fan drive gear system as recited in claim 3, wherein the rotating gutter extends radially outward of an outlet of the static baffle.

5. The fan drive gear system as recited in claim 1, wherein the oil receiving surface includes at least one scoop for capturing expelled oil from the fan drive gear system and from the rotating gutter.

6. The fan drive gear system as recited in claim 5, wherein the oil receiving surface is part of the aft auxiliary reservoir.

7. The fan drive gear system as recited in claim 5, further including a forward auxiliary reservoir with a forward oil receiving surface configured to receive oil expelled forward of the fan drive gear system.

8. The fan drive gear system as recited in claim 7, wherein the ring gear includes at least one passage for communicating expelled oil into at least one of the forward auxiliary reservoir and the aft auxiliary reservoir.

9. The fan drive gear system as recited in claim 1, wherein the static baffle is annular about the engine axis and the transfer bearing.

10. The fan drive gear system as recited in claim 1, wherein the rotating gutter is attached to an aft portion of the carrier radially outward of journal bearings supporting rotation of a corresponding one of the plurality of intermediate gears.

11. A turbine engine assembly comprising:
a static engine structure;
a fan section including a fan shaft coupled to a hub supporting a plurality of blades rotatable about an axis;
a fan drive gear system including a sun gear configured to be driven by an engine shaft rotatable about the axis, a plurality of intermediate gears intermeshed with the sun gear, a ring gear assembly engaged with the plurality of intermediate gears, the ring gear configured for attachment to the static engine structure, a carrier supporting rotation of the plurality of intermediate gears, the carrier is configured for rotation about the axis and includes a rotating oil inlet, and a rotating gutter attached to the carrier;
a transfer bearing fixed to the static engine structure and engaged to communicate oil to the rotating oil inlet;
a static baffle disposed radially outward of the transfer bearing and configured to capture oil expelled from the transfer bearing into the rotating gutter;
an aft auxiliary reservoir disposed radially outward of the rotating gutter;
an oil receiving surface configured to receive expelled oil from the rotating gutter and communicate the oil into the aft auxiliary reservoir;
the fan shaft coupled to the carrier;
a primary lubricant system communicating lubricant to the fan drive gear system; and
an auxiliary lubricant system including an auxiliary reservoir configured to receive lubricant expelled from the fan drive gear system and communicated through the aft auxiliary reservoir.

12. The turbine engine assembly as recited in claim 11, wherein the rotating oil inlet extends axially aft from the carrier.

13. The turbine engine assembly as recited in claim 12, wherein the rotating gutter is configured to impart momentum into the expelled oil communicated from the static baffle.

14. The turbine engine as recited in claim 13, wherein the rotating gutter extends radially outward of an outlet of the static baffle.

15. The turbine engine assembly as recited in claim 14, wherein the oil receiving surface includes at least one scoop for capturing expelled oil from the fan drive gear system and from the rotating gutter.

16. The turbine engine assembly as recited in claim 15, further including a forward auxiliary reservoir with a forward oil receiving surface configured to receive oil expelled forward of the fan drive gear system.

17. The turbine engine assembly as recited in claim 16, wherein the ring gear includes at least one passage for communicating expelled oil into at least one of the forward auxiliary reservoir and the aft auxiliary reservoir.

18. A lubrication system for a gas turbine engine comprising:
a transfer bearing fixed to a static engine structure and engaged to communicate oil to a rotating oil inlet of a rotating carrier of a fan drive gear system;
a static baffle disposed radially outward of the transfer bearing and configured to communicate oil expelled from the transfer bearing into a rotating gutter attached to the rotating carrier;
an aft auxiliary reservoir disposed radially outward of the rotating gutter;
an oil receiving surface configured to receive expelled oil from the rotating gutter and communicate the oil into the aft auxiliary reservoir;
a primary lubricant system communicating oil to the fan drive gear system; and
an auxiliary lubricant system including the aft auxiliary reservoir configured to communicate recovered oil to at least one of the fan drive gear system and the primary lubrication system.

19. The lubrication system as recited in claim 18, wherein the oil receiving surface includes at least one scoop for capturing expelled oil from the fan drive gear system and from the rotating gutter.

20. The lubrication system as recited in claim 19, further including a forward auxiliary reservoir with a forward oil receiving surface configured to receive oil expelled forward of the fan drive gear system.

* * * * *